UNITED STATES PATENT OFFICE.

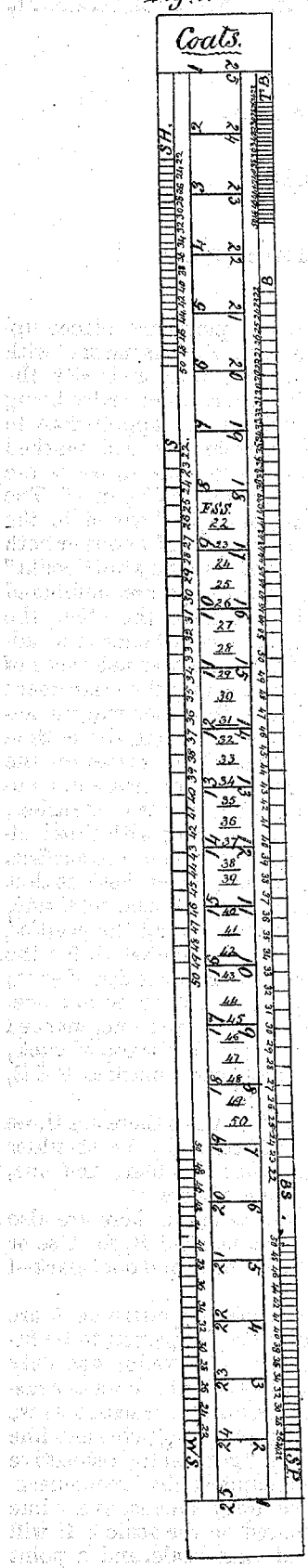
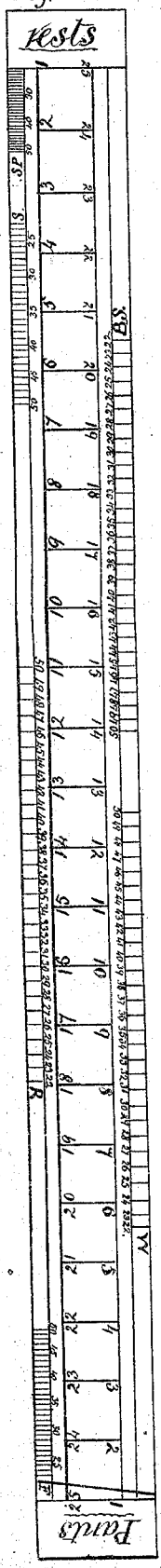
HUGH MATHESON.
Improvement in Tailors' Scales.
No. 124,602.
Patented March 12, 1872.
Inventor
Hugh Matheson
By his Attorney
Donald C. Ridout
George Ridout
Claud. J. Cayley } witnesses.

HUGH MATHESON, OF TORONTO, CANADA.

IMPROVEMENT IN TAILORS' SCALES.

Specification forming part of Letters Patent No. 124,602, dated March 12, 1872.

*To all whom it may concern:*

Be it known that I, HUGH MATHESON, of Toronto, in the county of York, Province of Ontario, and Dominion of Canada, have invented a new and Improved Tailor's Gauge; and I declare the following to be a full, clear, and exact description of the same, reference being had to accompanying drawing forming a part of this specification, in which—

Figures 1 and 2 are plans of opposite sides, and Fig. 3 a plan showing the edge of the gauge.

Similar letters of reference in the accompanying drawing denote the same parts.

This invention relates to an improved system of measuring, draughting, and cutting garments which I have communicated to the public in a book, copyrighted and published in the United States in September, 1871, entitled "H. Matheson's Scientific and Practical Guide for the Tailors' Cutting Department, being a Complete Treatise on Measuring, Draughting, and Making up, in all Styles, from Childhood to Old Age."

The object of this invention is to provide for the use of tailors a convenient instrument with which to draught coats, pants, and vests, according to the system of measurement and draughting explained and illustrated in said publication; and to this end the invention consists in the gauge or rule hereinafter described, with the system of graduated scales arranged upon it, as shown in the drawing, each one of said scales being adjusted to the measuring and locating of some particular line or point of the diagram from which the garment is to be cut.

In the drawing, in which the gauges are drawn to scale half size, they are represented as made of wood, metal, or other suitable material, twenty-five inches in length, with metallic tips at the ends one inch in length, making the entire length of the gauge twenty-seven inches. On each side the space between the ferrules or tips is divided into five longitudinal strips, the center strip being graduated into inches, and, if preferred, fractional parts of an inch, and numbered from each end; the marginal strips being graduated into the different scales hereinafter described; and the strips intermediate between the margins and center being employed to contain the numbers of the marginal scale, as clearly represented.

The scales for coats and pants are placed upon one side of the gauge, which is marked with the word "vests" at one end, and with the word "pants" at the other, these scales being so arranged that such as are appropriate to vests are numbered from the end marked "vests," while those appropriate to pants are numbered from the end marked "pants." The opposite side of the gauge is devoted to the scales appropriate to coats, and at one or both ends the gauge is marked with the word "coats." Some of the scales on this side are numbered from one end, and some from the other, the principle of their arrangement being to so adjust them that the tailor can first use those of one margin, and then, turning the instrument end for end, use those of the other margin, following their regular order around the outline of the instrument. One of the scales on the "coat" side of the gauge is arranged and numbered in the central space alloted to inches, its graduation not interfering with those already placed upon that portion of the surface. The number of scales employed, besides that of inches, is fourteen, viz.: On the coat side, one, marked S H, for determining the position of the sleeve-head; one, numbered S, for the shoulder; one, marked W S, for width of scye; one, marked S P, for shoulder point; one, marked B S, for bottom of scye; one, marked B, for back; one, marked T B, for top of back; and one in the central space, marked F S S, for frock side seam.

On the part devoted to vests there are three scales, viz.: One, marked S P, for shoulder point; one, marked S, for shoulder; and one, marked B S, for bottom of scye.

On the part devoted to pants there are also three scales, viz.: One, marked R, for rise or seat; one, marked F, for fork; and one, marked W, for waist.

The scales placed upon the instrument are so constructed that when the person to be fitted is of good proportions the tailor has only to find one dimension—viz., the breast-measure in coats and vests, and the waist-measure in pants—and then lay off every point and line of the draught to that figure on the respective scales. For example, suppose the breast-measure of a coat to be forty inches, every line that has to be measured on the scale S H will be to the figure 40 of that scale, and a point will be marked there. Every line that has to be measured on the scale S will be to the figure 40 of that scale, and a point will be established there; and so on till all the lines and points of the draught are established, so that, the breast-measure in coats and vests and the waist-measure in pants having been once found, no calculations are to be made, but we have only to look for that figure on each scale and measure to it on the draught. Now, as that figure is always the breast or waist measure, it follows that it will always fall somewhere between 22 and 50, there hardly ever being an instance where the waist or breast measure falls below the former or above the latter figure. It is only necessary, therefore, to lay off on the instrument so much of each scale as is included between the figures 22 and 50. And it will be observed, by inspecting the gauge, that all of each scale below 22 and all above 50 is suppressed. This gives room to arrange several scales on the same line without their interfering with each other. The variations of a few figures below or above those numbers would not, of course, be a departure from the principle, but such variation is of no pratical use.

The size of the graduations upon the various scales is determined empirically. My system of measuring, as described in the publication referred to, determines the lines and points to be obtained. A long experience and a vast number of experiments have enabled me to ascertain the relation between these lines and points on the one hand and the breast and waist measure on the other. Having this relation, I adjust the length of the respective scales to correspond to it, so that, when the gauge is laid properly upon the cloth to coincide with any given line of the diagrams, the point where the figure indicating the waist or breast measure comes will always be one of the essential points of the draught. The instrument is thus specially prepared and adapted to carrying out the particular system of draughting described in my said printed publication—a purpose which can be accomplished by no other instrument or system of scales ever before brought to the notice of the public.

I am, of course, aware that a great many systems of measuring, draughting, and cutting garments have been from time to time described in patents or introduced into use, and a variety of gauges and measuring and draughting instruments have been invented by which to carry such systems into practice. I do not claim any of these instruments adapted to other systems than my own. My invention differs from them all, first, in the employment of the fourteen separate scales by which to ascertain and draught the fourteen lines and points that are necessary under my system; second, in the suppression, upon the gauge, of all graduations and numbers under 22 and over 50; third, in so adjusting the several scales that the draughtsman has only to work by a single number for the whole series; and, fourth, in arranging the scales around the gauge, as shown, whereby the instrument is reduced in size and made more convenient of operation. The combination of these four elements adapts the instrument to my purpose; and I therefore claim—

The tailor's measuring and draughting instrument herein described, consisting of a wooden rule, having arranged upon it in the manner shown that part of the fourteen scales included between the numbers 22 and 50, said scales being adjusted to the different lines and points for draughting coats, pants, and vests by my improved system, and being so constructed as to lay off said lines and points for any garment by measuring to the same figure on each appropriate scale, substantially as described.

City of Toronto, January 19, 1871.

HUGH MATHESON.

Witnesses:
DONALD C. RIDOUT,
CLAUD. P. GAYLEY.